A. N. SAMMARONE.
ELECTRODYNAMIC MACHINE.
APPLICATION FILED AUG. 16, 1916.
1,262,264. Patented Apr. 9, 1918.
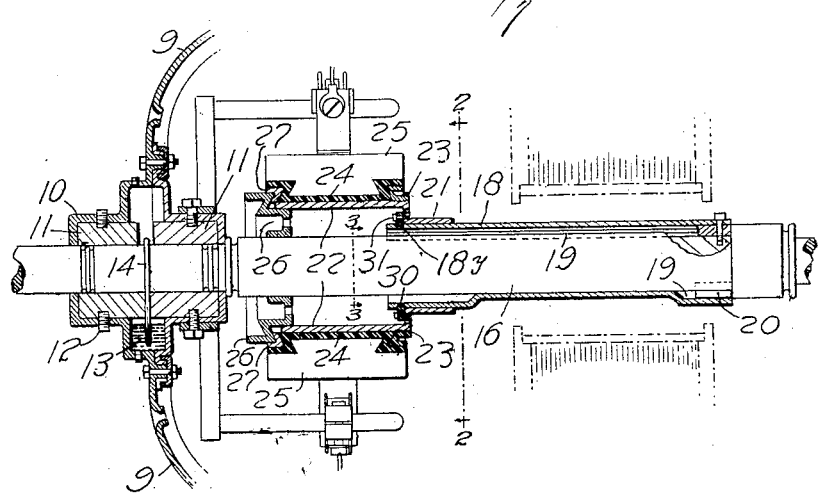
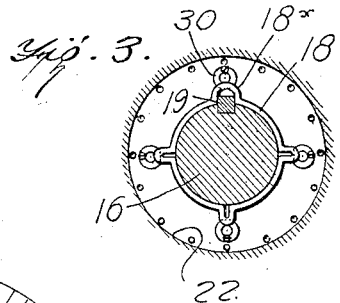
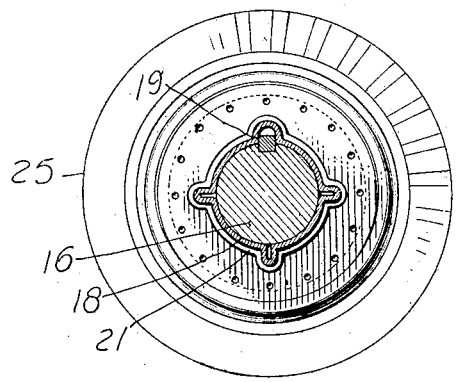
WITNESSES
INVENTOR
AMATO N. SAMMARONE,
BY
ATTORNEYS

UNITED STATES PATENT OFFICE.

AMATO N. SAMMARONE, OF AKRON, OHIO.

ELECTRODYNAMIC MACHINE.

1,262,264.  Specification of Letters Patent.  Patented Apr. 9, 1918.

Continuation in part of application Serial No. 74,247, filed January 25, 1916. This application filed August 16, 1916. Serial No. 115,265.

*To all whom it may concern:*

Be it known that I, AMATO N. SAMMARONE, a citizen of the United States, and a resident of Akron, in the county of Summit and State of Ohio, have invented a certain new and useful Improvement in Electrodynamic Machines, of which the following is a specification.

This invention is an improvement in electrodynamic machines, and is a continuation in part of my application, Number 74,247, filed in the United States Patent Office January 25, 1916.

The present invention relates particularly to the commutator support, and the invention consists in certain novel constructions and combinations of parts as will be hereinafter described and claimed.

In the drawings:

Figure 1 is a central sectional view through a portion of the machine, showing the improved commutator support;

Fig. 2 is a cross section on about the line 2—2 of Fig. 1, and

Fig. 3 is a cross section on about the line 3—3 of Fig. 1.

Referring to Fig. 1, the shaft 16 has bearings in boxes 10, carried by the hangers 9. The boxes 10 are of pressed steel, each half having any form or any number of offsets desired, which also can be used in the construction of pulleys and shaft hangers for all purposes, there being a portion on each side of the hanger 9 secured by welding, screws or bolts. These portions include bearing pieces 11, which are held in position by means of screws 12. The lower portion of the boxing is formed into an oil chamber 13, in which an oil ring 14 dips.

Disposed on the shaft 16 is a sleeve 18 which is provided with a pressed key-way 19 into which a key 20 may be inserted, to key it to the shaft 16. One end of this sleeve fits into the reduced portion 21 of the commutator support 22. The latter is threaded externally at one end to receive a flanged U-shaped ring 23 having dove-tailed flanges arranged to crowd insulating material 24 into the dove-tailed recesses of the commutator bar 25, or parts 21 and 18 may be combined in one piece. At the opposite end of the commutator support 22 it is threaded internally to receive a ring 26 which is substantially Z-shaped in cross section to force a smaller ring 27 of V-shaped cross section against the insulation 24, so as to crowd the insulation into the dove-tailed recess at this end of the commutator bar, thus holding the parts securely in position.

As will be seen from Fig. 3, the sleeve 18 has stamped portions 18$^x$ which are slotted at 18$^y$, see Fig. 1, to receive washers 30. These washers are held by means of bolts 31 in position, the bolts passing into the commutator support in order to prevent longitudinal movement of the latter on the sleeve 18.

In the construction described above, it will be noted that the insulation 24 is held securely in position in such a manner that the commutator bars are gripped firmly, thereby preventing any danger of becoming loosened in the operation of the machine. The construction further provided for quick dismantling of the commutator so as to take apart for repair or replacement of any particular commutator bar.

I am aware that changes and modifications may be made in which more or fewer parts might be used or in which different materials may be used without departing from the spirit and scope of the invention.

I claim:—

1. In a dynamo electric machine, a commutator assembly comprising a cylindrical member having a reduced cylindrical portion at one end thereof, means for connecting said reduced cylindrical portion with the main shaft of the machine, a series of commutator bars disposed about said first named cylindrical member, said commutator bars having V-shaped notches in their ends, insulation material disposed in said V-shaped notches and rings of wedge-shaped cross section screwed through each end of said cylindrical member for forcing said insulation into the V-shaped notches of the commutator bars, that ring at the end of the first named cylindrical portion adjacent to the reduced portion being on the outside of said cylindrical portion, and that ring at the opposite end being threaded to the interior portion of said cylindrical member.

2. In a dynamo electric machine, a commutator assembly comprising a hollow cylindrical member having a reduced cylindrical portion at one end thereof, means for connecting said reduced cylindrical portion with the main shaft of the machine, a series of commutator bars disposed about said cylindrical member, said commutator bars having V-shaped notches at their ends, a ring disposed exteriorly of said cylindrical member at one end thereof, said ring having a wedge-shaped edge arranged to enter one of the notches in the ends of said commutator bars for holding the bars in position, and a second ring having a portion threaded to the interior of said hollow cylindrical member and being arranged to bear on said shaft, said second named ring also having a V-shaped portion arranged to enter the notch at the opposite end of said commutator bars.

AMATO N. SAMMARONE.

Copies of this patent may be obtained for five cents each, by addressing the "Commissioner of Patents, Washington, D. C."